United States Patent
Kassai et al.

(10) Patent No.: US 6,935,685 B2
(45) Date of Patent: Aug. 30, 2005

(54) SEAT FORMING MEMBER AND HEAD PROTECTOR OF CHILD-CARE INSTRUMENT

(75) Inventors: Kenzou Kassai, Osaki (JP); Ichiro Ohnishi, Nara (JP)

(73) Assignee: Aprica Kassai Kabushikikaisha, Osaka (JP)

(*) Notice: Subject to any disclaimer, the term of this patent is extended or adjusted under 35 U.S.C. 154(b) by 0 days.

(21) Appl. No.: 10/788,026

(22) Filed: Feb. 25, 2004

(65) Prior Publication Data

US 2004/0195878 A1 Oct. 7, 2004

(30) Foreign Application Priority Data

Mar. 3, 2003  (JP) ........................................ 2003-056085

(51) Int. Cl.[7] .............................. A47C 7/14; A47C 7/36
(52) U.S. Cl. .............................. 297/219.1; 297/219.12; 297/230.1; 297/230.12; 297/230.13
(58) Field of Search .......................... 297/219.12, 397, 297/230.1, 230.12, 230.13, 219.1

(56) References Cited

U.S. PATENT DOCUMENTS

| | | | |
|---|---|---|---|
| 4,435,012 A | | 3/1984 | Kassai |
| 5,586,351 A | * | 12/1996 | Ive ..................... 297/219.12 X |
| 5,735,576 A | * | 4/1998 | Pepys et al. ........ 297/219.12 X |
| 5,916,089 A | * | 6/1999 | Ive ..................... 297/219.12 X |
| 5,918,933 A | * | 7/1999 | Hutchinson et al. ... 297/219.12 |
| 5,979,981 A | * | 11/1999 | Dunne et al. .......... 297/219.12 |
| 6,036,263 A | * | 3/2000 | Gold ..................... 297/219.12 |
| 2002/0014793 A1 | * | 2/2002 | Santha .................. 297/219.12 |
| 2002/0070592 A1 | * | 6/2002 | Norman ................. 297/219.12 |
| 2003/0193223 A1 | * | 10/2003 | Norman ................. 297/219.12 |
| 2004/0145224 A1 | * | 7/2004 | Kassai et al. .......... 297/219.12 |

FOREIGN PATENT DOCUMENTS

| | | |
|---|---|---|
| DE | 3901743 | 7/1989 |
| EP | 0519857 | 12/1992 |
| FR | 2495560 | 6/1982 |
| JP | 57-95254 | 6/1982 |

* cited by examiner

Primary Examiner—Rodney B. White
(74) Attorney, Agent, or Firm—W. F. Fasse; W. G. Fasse

(57) ABSTRACT

A seat forming member is mounted on a child-care instrument which can be changed between a chair state and a bed state, to form a seat and comprises a backrest wall and a top wall flexibly connected to an upper part of the backrest wall. In the bed state, the top wall bends forward so as to form an angle with the backrest wall. The seat forming member comprises a pair of side protecting members extending sideward from both sides of the top wall. Each of side protecting members is guided by a side wall of the seat and bends forward from the top wall so as to be positioned over the backrest wall in the bed state.

17 Claims, 7 Drawing Sheets

SEAT FORMING MEMBER AND HEAD PROTECTOR OF CHILD-CARE INSTRUMENT

BACKGROUND OF THE INVENTION

1. Field of the Invention

The present invention relates to a child-care instrument comprising a seat, which can be changed between a chair state and a bed state, and more particularly, it relates to a structure for protecting a head of a child.

2. Description of the Background Art

As the child-care instrument comprising a seat, which can be changed between a chair state and a bed state, there are a baby carriage, a child-car seat, a child safety seat, a baby bed/chair and the like.

Japanese Unexamined Patent Publication No. 57-95254 discloses a seat of a baby carriage which can be changed between a chair state and a bed state. FIGS. 1 and 2 illustratively show a seat forming member 1 disclosed in the above document, in which FIG. 1 shows the chair state thereof and FIG. 2 shows the bed state thereof.

The seat forming member 1 comprises a seat wall 2, a backrest wall 3 and a top wall 4 flexibly connected to an upper part of the backrest wall 3. In the chair state shown in FIG. 1, the top wall 4 is positioned in the same plane as the backrest wall 3. In the meantime, in the bed state shown in FIG. 2, the top wall 4 bends forward so as to form an angle with the backrest wall 3 to protect the top of the head of a child when laid down.

In addition, the term "seat forming member" used in this specification means one mounted on a child-care instrument body to form a seat, which includes a seat hammock, a seat core and the like.

When the child is small in size, there is generated a large gap between the head of the child and a side face of the seat of the child-care instrument. In the bed state especially, the large gap between the temporal region of the child and the side face of the seat is not preferable in view of safety.

SUMMARY OF THE INVENTION

It is an object of the present invention to provide a seat forming member and a head protector of a child-care instrument which can sufficiently protect a head of a child in a bed state especially.

A seat forming member of a child-care instrument according to the present invention is mounted on the child-care instrument which can be changed between a chair state and a bed state, to form a seat and comprises a backrest wall and a top wall flexibly connected to an upper part of the backrest wall. The top wall bends forward so as to form an angle with the backrest wall in the bed state. The present invention is characterized in the following points.

That is, the seat forming member comprises a pair of side protecting members connected to the top wall and extending sideward from both sides of the top wall. Each side protecting member is guided by a side wall of a seat and bends forward from the top wall so as to be positioned over the backrest wall in the bed state.

According to one embodiment, each side protecting member is formed of a flexural material.

According to another embodiment, the seat forming member comprises a head protector integrally having a center member positioned along the top wall and the pair of side protecting members. The head protector is preferably formed of a flexural material.

According to still another embodiment, the head protector is detachably connected to the top wall.

According to still another embodiment, the pair of side protecting members is connected to both edges of the top wall through a hinge. In this case, the top wall and the pair of side protecting members are integrally formed, for example.

According to another aspect, a seat forming member of a child-care instrument according to the present invention comprises a backrest wall, a top wall flexibly connected to an upper part of the backrest wall, and a pair of side protecting members connected to the top wall and extending sideward from both sides of the top wall. Each side protecting member is provided so as to be able to bend forward from the top wall.

Each side protecting member is formed of a flexural material, for example. According to another embodiment, each side protecting member is connected to side edge of the top wall through a hinge.

A head protector according to the present invention is detachably connected to a top wall of a seat forming member having a backrest wall and a top wall flexibly connected to an upper part of the backrest wall. The head protector comprises a center region fixed to the top wall and a pair of side regions extending sideward from both sides of the center region so as to be able to bend.

According to one embodiment, the head protector further comprises an interval adjusting member for adjusting an interval between the center region and the top wall.

In addition, according to one embodiment, the head protector comprises a center plate positioned at the center region and an elastic plate stuck on the center plate. The elastic plate includes side extending parts extending from both sides of the center plate to form the pair of side regions. As a further specific structure, the head protector comprises a back face plate stuck on a back face of the elastic plate at the center region. The back face plate includes a center fixed part fixed to the elastic plate and a pair of bending parts flexibly connected to both side edges of the center fixed part through a hinge.

A meritorious effect of each component is described in a section of the following "description of the embodiments".

DESCRIPTION OF THE EMBODIMENTS

Figure 1:
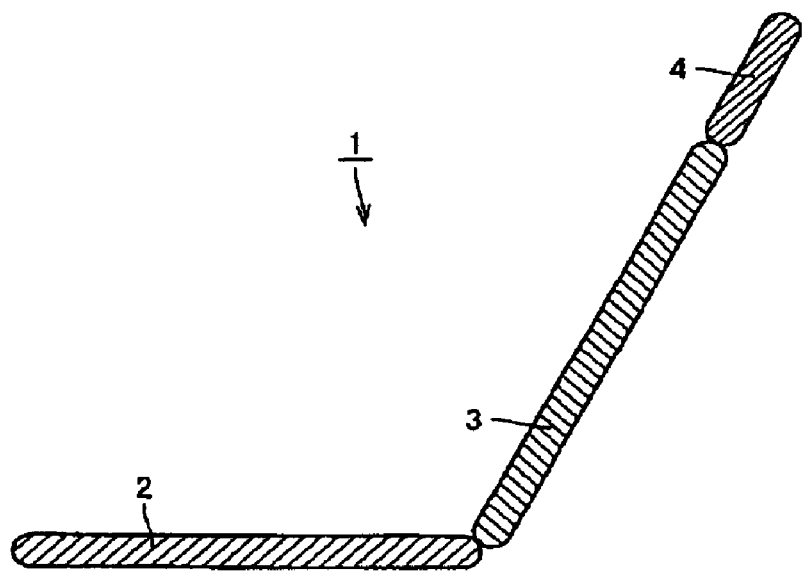
FIG. 1 is a view showing a seat forming member in a chair state.
Figure 2:
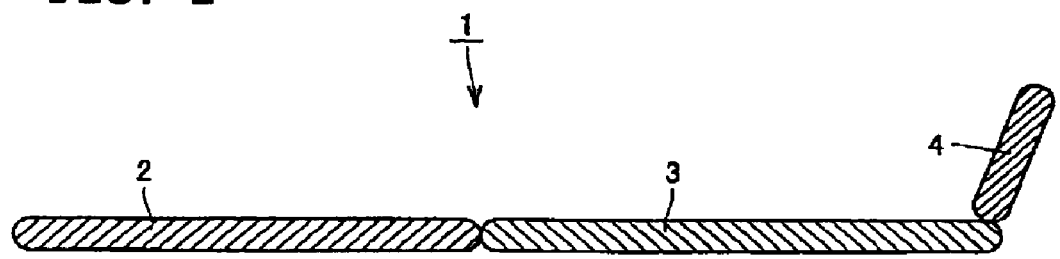
FIG. 2 is a view showing a seat forming member in a bed state.
Figure 3:
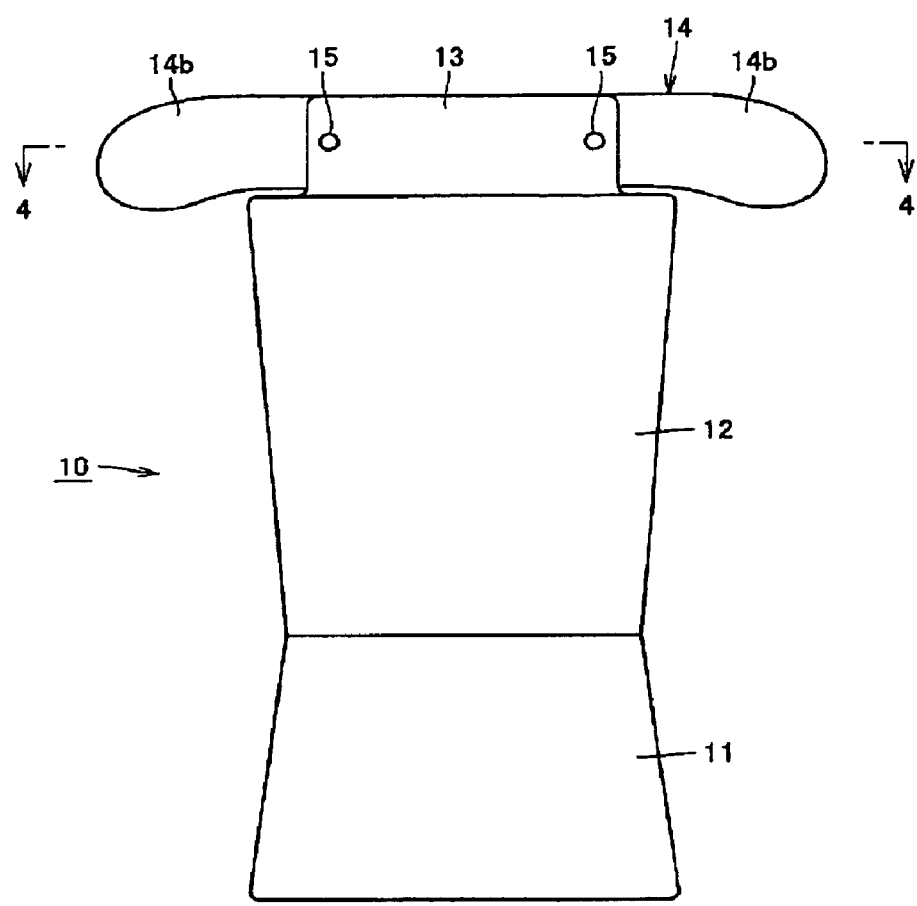
FIG. 3 is a view showing an embodiment of the present invention.
Figure 4:
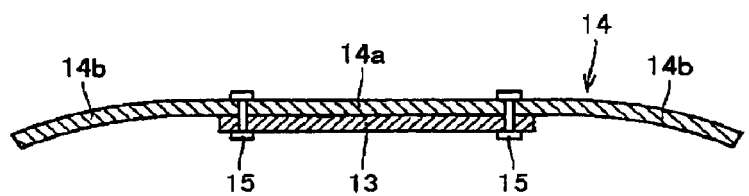
FIG. 4 is a sectional view taken along line 4—4 in FIG. 3.

FIGS. 3 to 6 show an embodiment of the present invention. An illustrated seat forming member 10 is mounted on a body of a baby carriage which can be changed between a chair state and a bed state and forms a seat.

The seat forming member 10 comprises a seat wall 11, a backrest wall 12, and a top wall 13 flexibly connected to an upper part of the backrest wall 12. The top wall 13 bends forward so as to form an angle with the backrest wall 12 and protects the top of the head of a child when the baby carriage is in the bed state.

A head protector 14 is mounted on the top wall 13 through screws 15. The head protector 14 is a sheet of flexural plate member and has a center member 14a fixed to the top wall 13 and a pair of side protecting members 14b extending sideward from both sides of the top wall 13.

Figure 5:
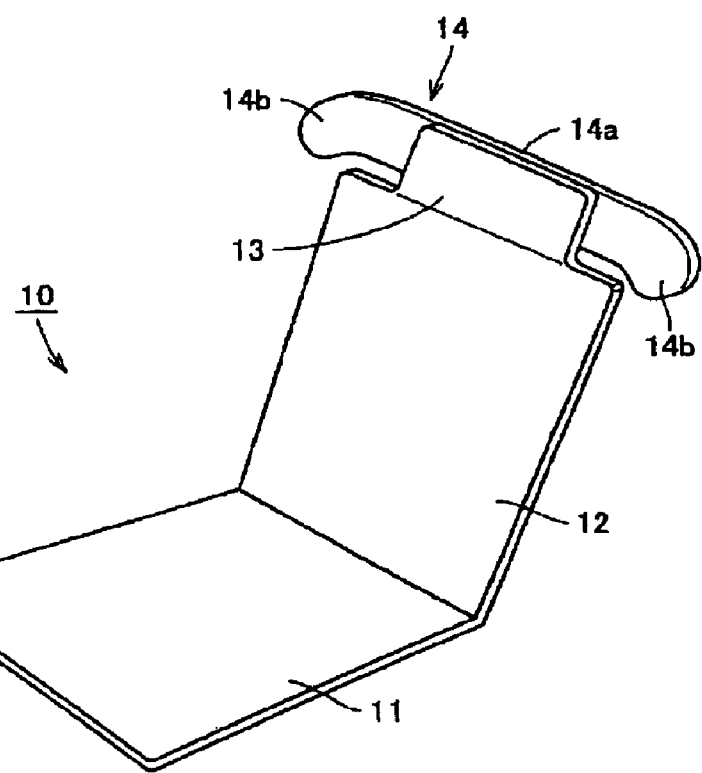
FIG. 5 is a view showing a chair state of the seat forming member in FIG. 3.

As shown in FIG. 5, when the baby carriage is in the chair state, the top wall 13 extends so as to extend a backrest surface of the backrest wall 12 upward such that the top of the head of the child is open. In this state, the pair of side protecting members 14b of the head protector 14 extends sideward from both sides of the top wall 13 such that the temporal region of the child is open.

Figure 6:
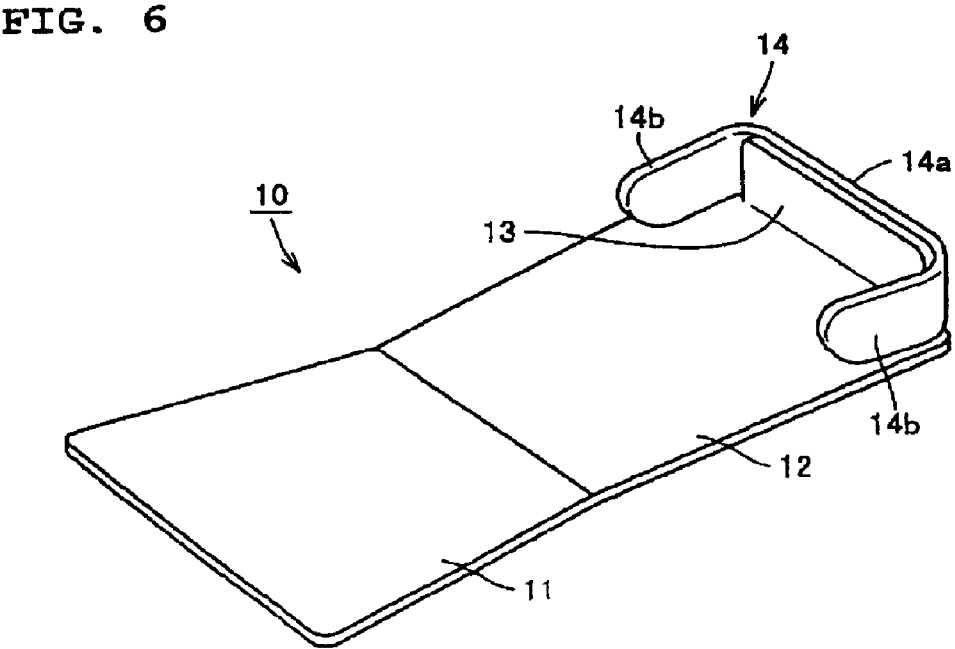
FIG. 6 is a view showing a bed state of the seat forming member in FIG. 3.

In the bed state shown in FIG. 6, the top wall 13 bends forward from the backrest wall 12 so as to form an angle with it to protect the top of the head of the child. In this state, the pair of side protecting members 14b of the head protector 14 is guided by side walls (not shown) of the seat of the baby carriage and bends forward from both sides of the top wall 13 so as to be positioned over the backrest wall 12 to protect the temporal region of the child.

As the side walls of the seat which guide the pair of side protecting members 14b to bending, there are a side forming member of a seat hammock, a body frame of the baby carriage and the like. In order to fill a gap between the side wall and the temporal region of the child and to provide a soft touch, a pad or a cushion member may be mounted on the pair of side protecting members 14b.

When the seat of the baby carriage is changed from the bed state shown in FIG. 6 to the chair state shown in FIG. 5, the pair of side protecting members 14b elastically returns to the position in which it extends sideward from both sides of the top wall 13.

Although the head protector 14 is constituted by a sheet of plate member in the illustrated embodiment, as its variation, the pair of side protecting members 14b may be separated and formed of another member. In addition, the head protector 14 may be detachably connected to the top wall 13.

Figure 7:
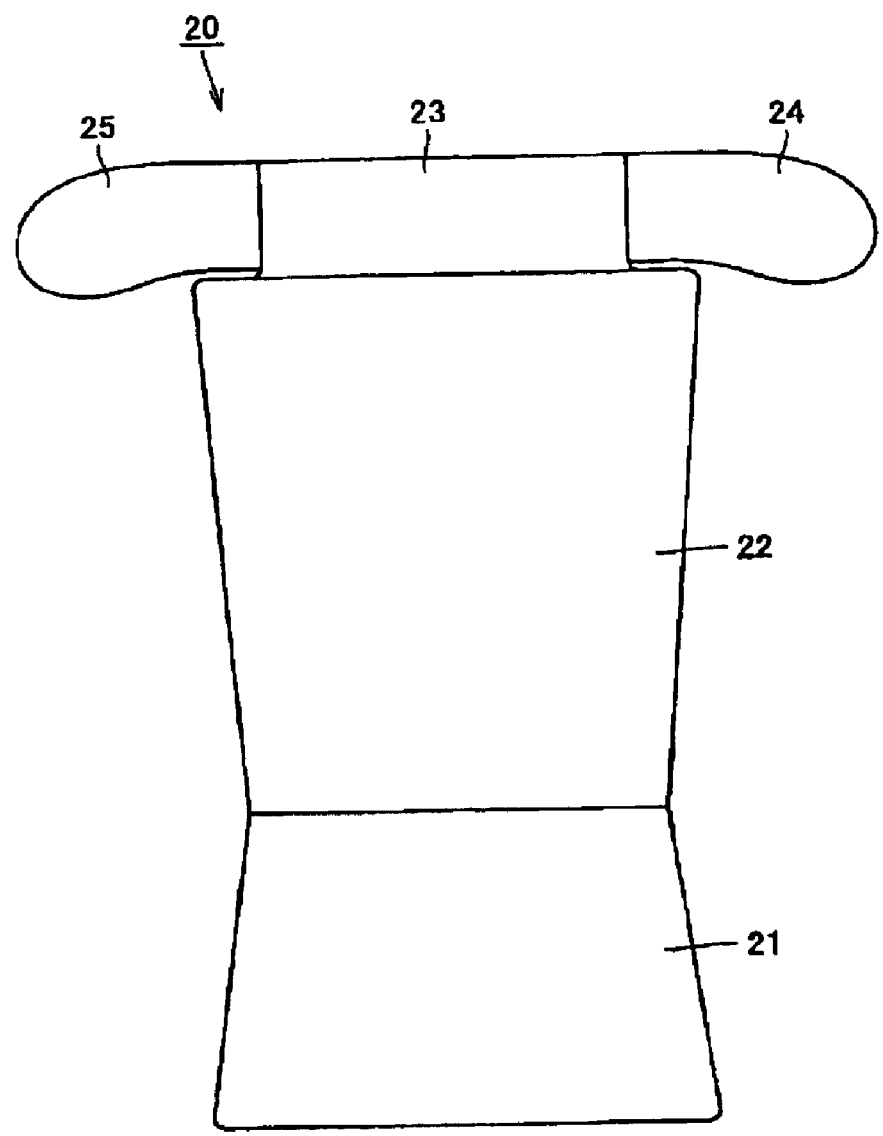
FIG. 7 is a view showing another embodiment of the present invention.

FIG. 7 shows another embodiment of the present invention. An illustrated seat forming member 20 is a seat core and it is directly mounted on a body of a baby carriage or put in a seat hammock.

As shown in FIG. 7, the seat forming member 20 comprises a seat wall 21, a backrest wall 22, a top wall 23, and a pair of side protecting members 24 and 25. The side protecting members 24 and 25 are flexibly connected to both edges of the top wall 23 through hinges. When the seat forming member 20 is formed of a sheet of a resin plate material, the hinge may be formed of a thinned part reduced in thickness.

Figure 8:
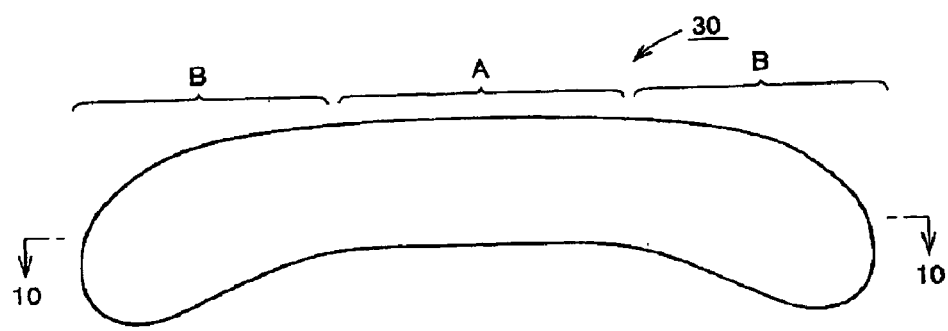
FIG. 8 is a front view showing a head protector.
Figure 9:
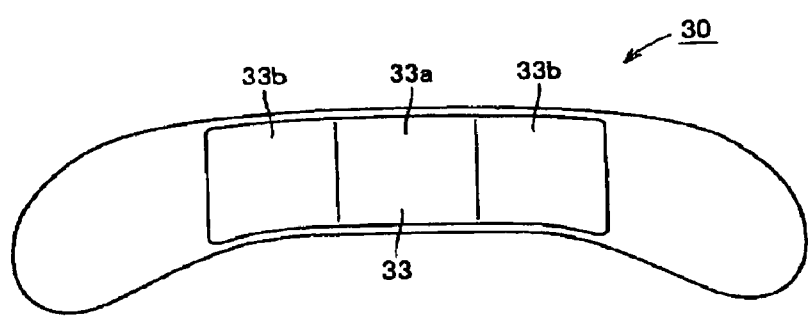
FIG. 9 is a back view showing the head protector in FIG. 8.
Figure 10:
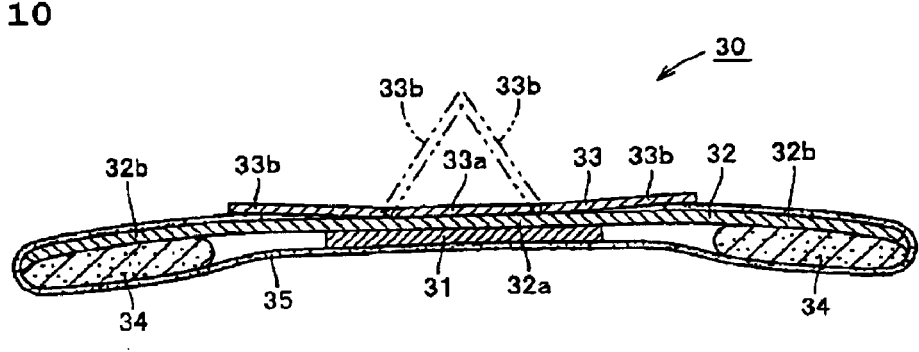
FIG. 10 is a sectional view taken along line 10—10 in FIG. 8.
Figure 11:
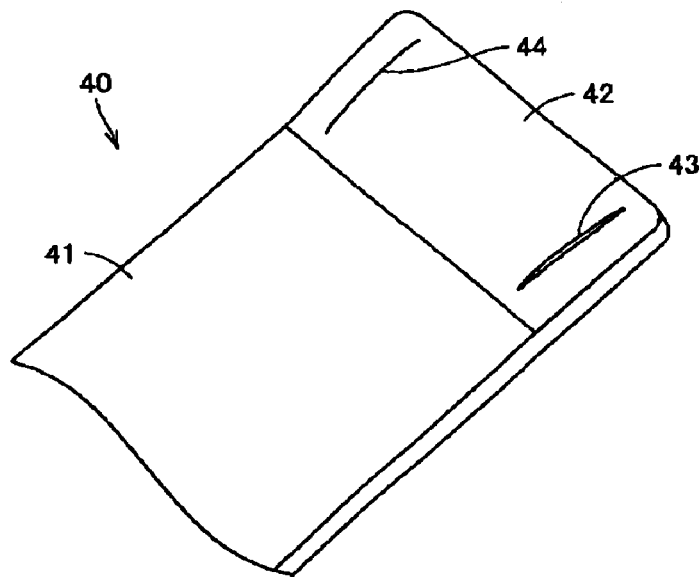
FIG. 11 is a view showing a seat hammock.
Figure 12:
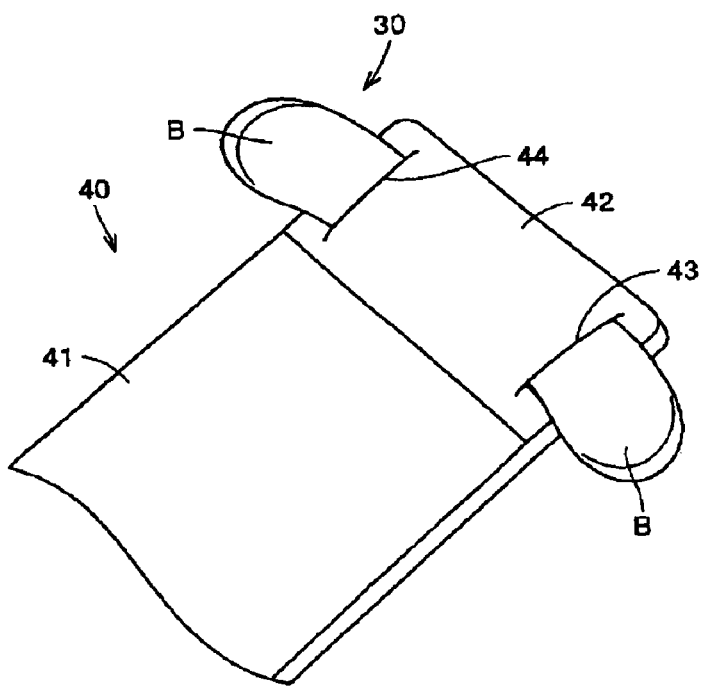
FIG. 12 is a view showing a state in which a head protector is mounted on the seat hammock in FIG. 11.

FIGS. 8 to 10 show a head protector 30 according to another embodiment. FIGS. 11 and 12 show a seat hammock 40 as a seat forming member on which the head protector 30 is mounted. The seat hammock 40 has a backrest wall 41, and a top wall 42 which is flexibly connected to an upper part of the backrest wall 41. The seat hammock 40 comprises a cloth cover and two cuts 43 and 44 are formed apart from each other in the cover on the top wall 42.

The head protector 30 is detachably connected to the top wall 42 of the seat hammock 40 and as shown in FIG. 12, it comprises a center region A (FIG. 8) fixed to the top wall 42 and a pair of side regions B (FIG. 8) extending sideward from both sides of the center region such that it can bend.

A structure of the head protector 30 is concretely described with reference to FIG. 10. The head protector 30 comprises a center plate 31 positioned at the center region A, and an elastic plate 32 stuck on the center plate 31. The elastic plate 32 has a center part 32a fixed to the center plate 31 and side extending parts 32b extending sideward from both sides of the center plate 31 to form the pair of side regions B.

The head protector 30 further comprises a back face plate 33 stuck on a back surface of the elastic plate 32 at the center region A, a cushion material 34 disposed on the pair of side extending parts 32b, and a cover 35. The cover 35 covers the center plate 31, the cushion material 34 and the pair of side extending part 32b. The back face plate 33 is provided outside of the cover 32.

The back face plate 33 includes a center fixed part 33a fixed to the elastic plate 32 and a pair of bending parts 33b flexibly connected to both edges of the center fixed part 33a through hinges. As shown by a phantom line in FIG. 10, the bending parts 33b of the back face plate 33 can be raised backward. The bending parts 33b serve as an interval adjusting member for adjusting an interval between the center region A of the head protector 30 and the top wall 42 of the seat hammock 40. This will be described later.

As shown in FIGS. 11 and 12, the head protector 30 is mounted on the top wall 42 by passing the head protector 30 through the cuts 43 and 44 formed in the top wall 42 of the seat hammock 40. In a mounted state shown in FIG. 12, the side regions B of the head protector 30 emerge from the cuts 43 and 44 and extend sideward.

FIG. 12 shows the seat hammock 40 in the chair state. When the seat hammock is changed from this state to the bed state, the top wall 42 bends forward from the backrest wall 41 so as to form an angle with it and the side regions B of the head protector 30 bend forward from the top wall 42 to be positioned over the backrest wall 41.

When the seat hammock 40 is changed from the bed state to the chair state, the head protector 30 elastically returns to the configuration shown in FIG. 12.

Figure 13:
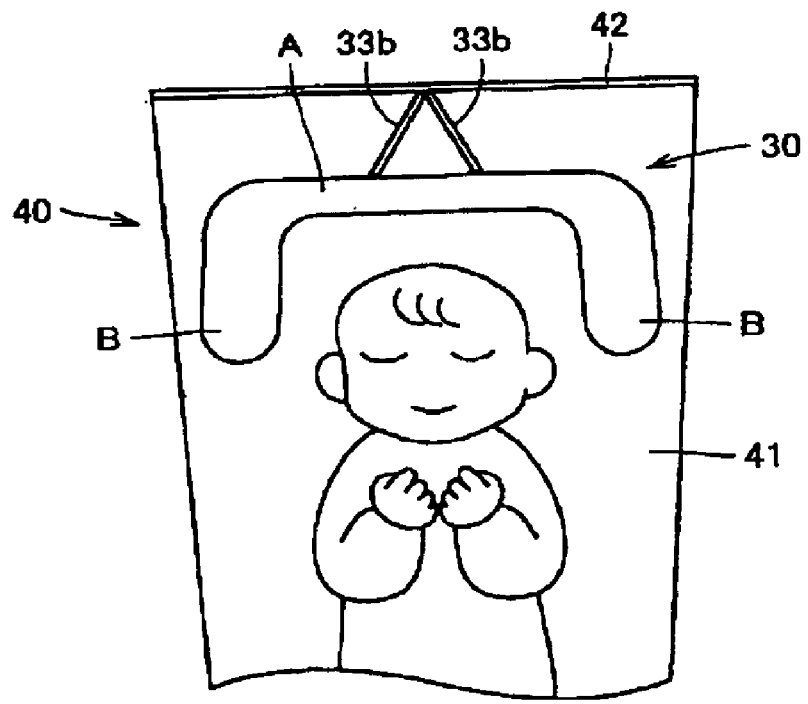
FIG. 13 is a view showing a state in which the head protector is positioned apart from the top wall of the seat hammock.
Figure 14:
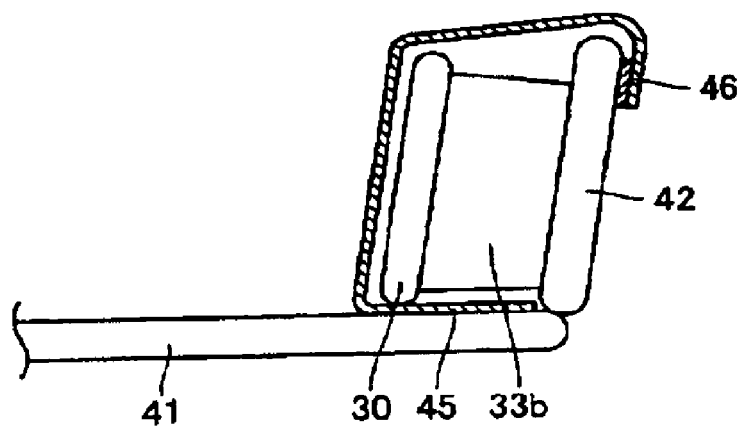
FIG. 14 is a view showing the head protector and the top wall shown in FIG. 13 seen from the side face.
Figure 1:
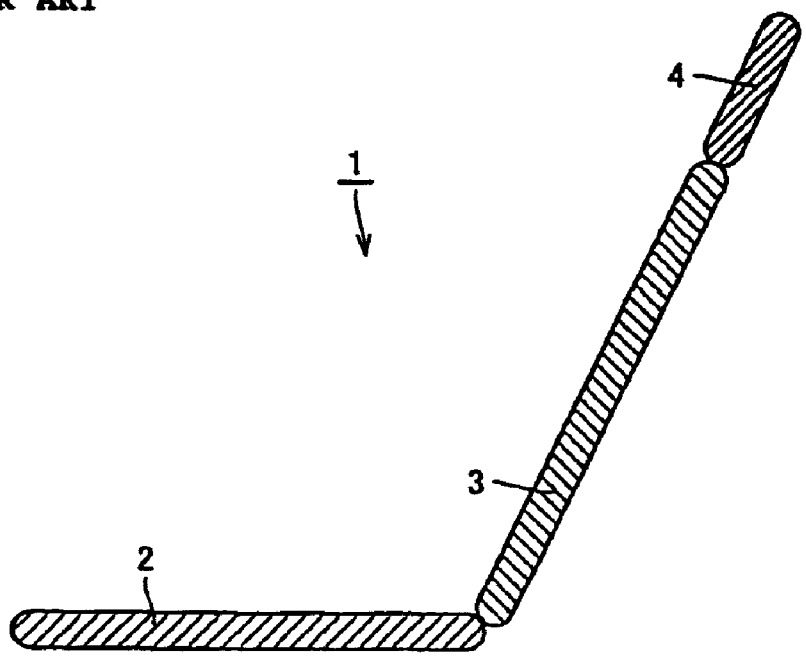
Figure 2:
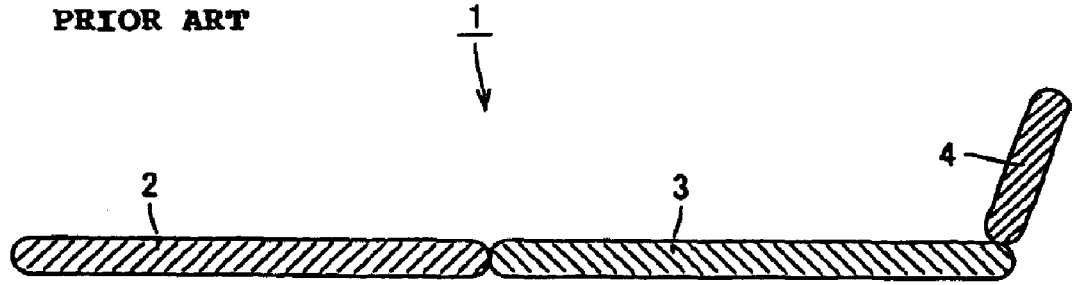
Figure 3:
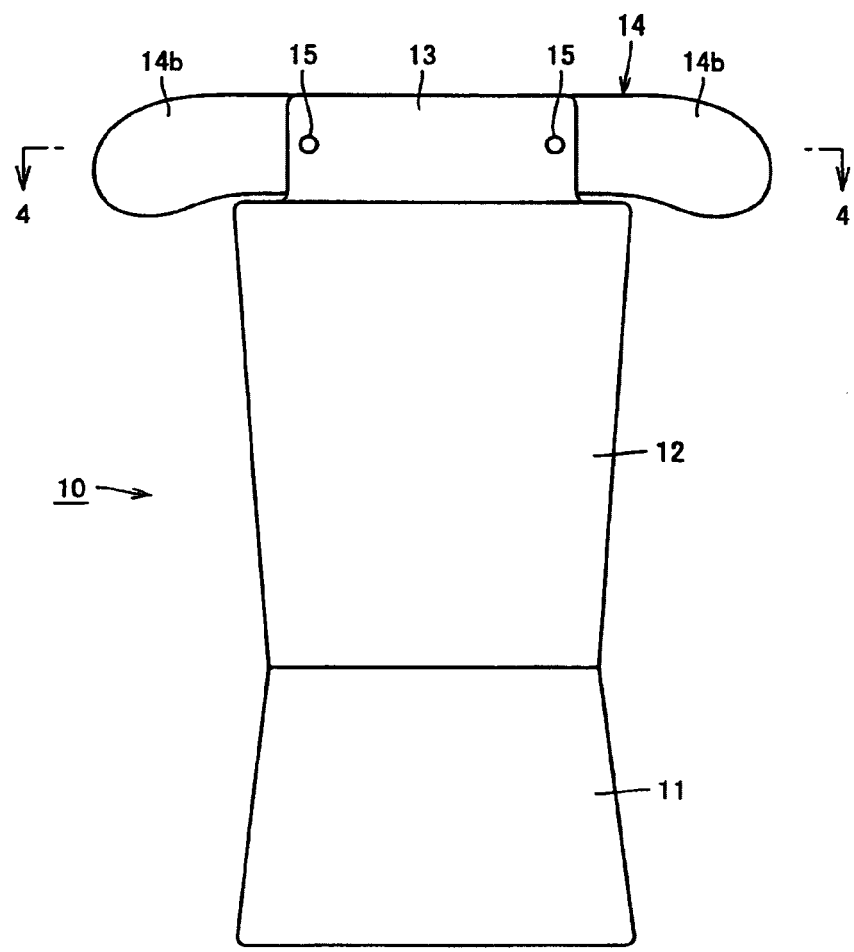
Figure 4:
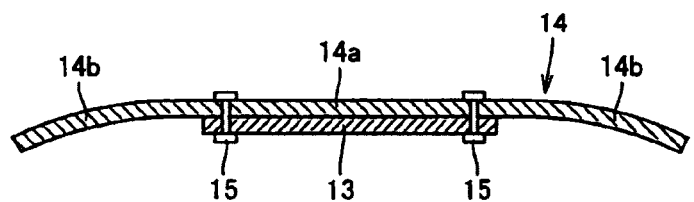
Figure 5:
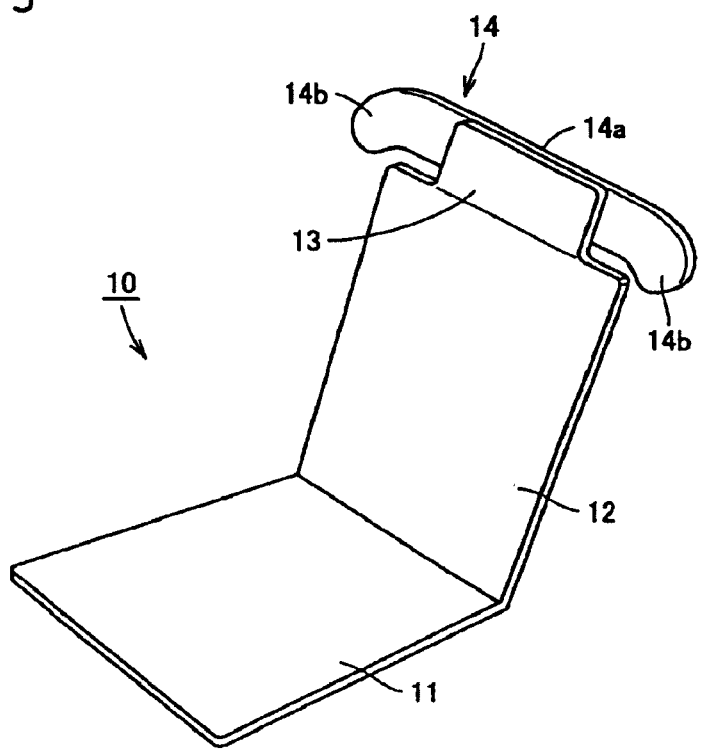
Figure 6:
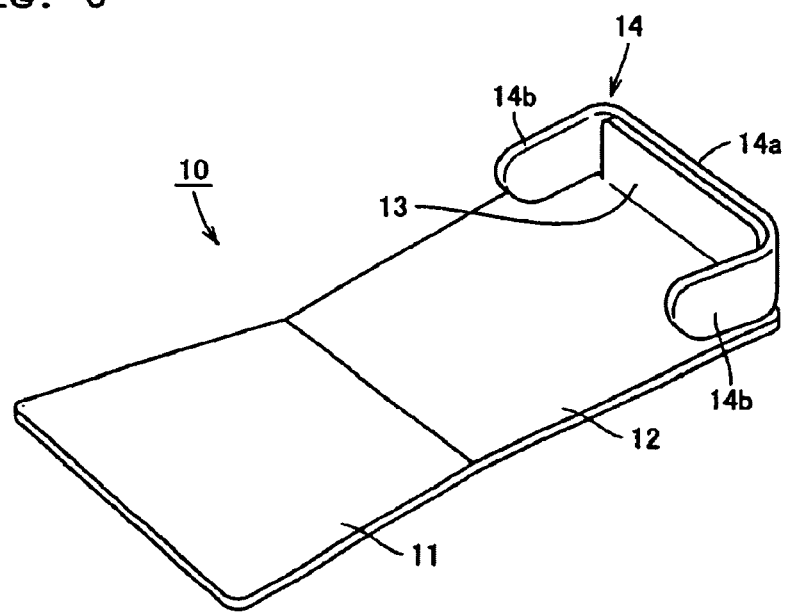
Figure 7:
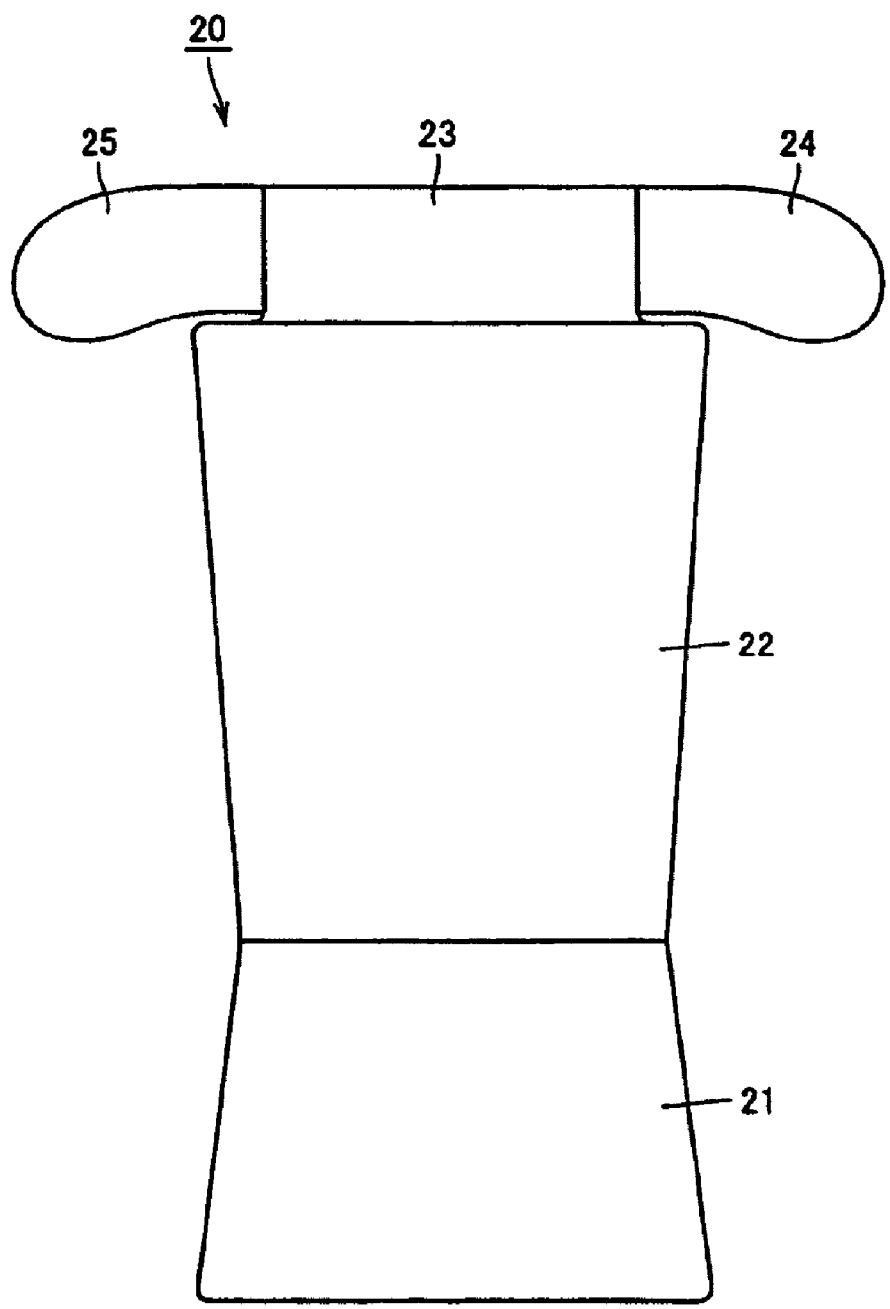
Figure 8:
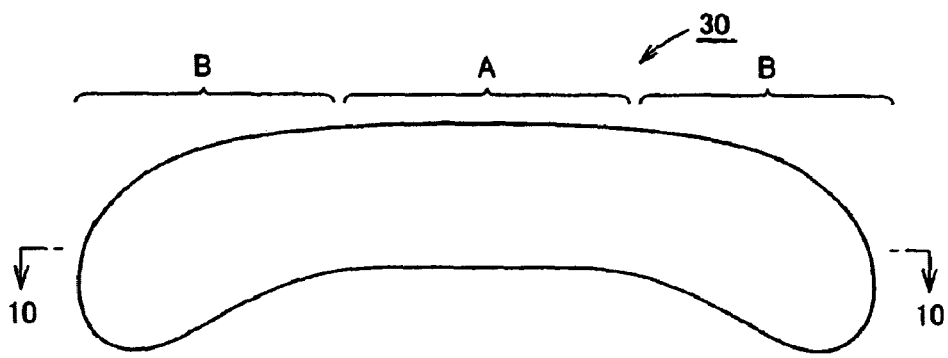
Figure 9:
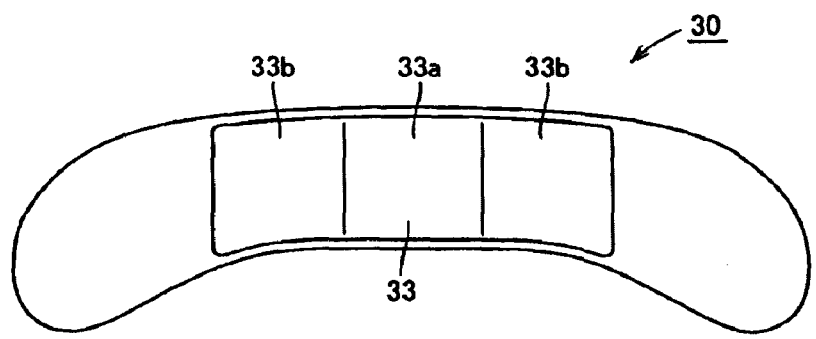
Figure 10:
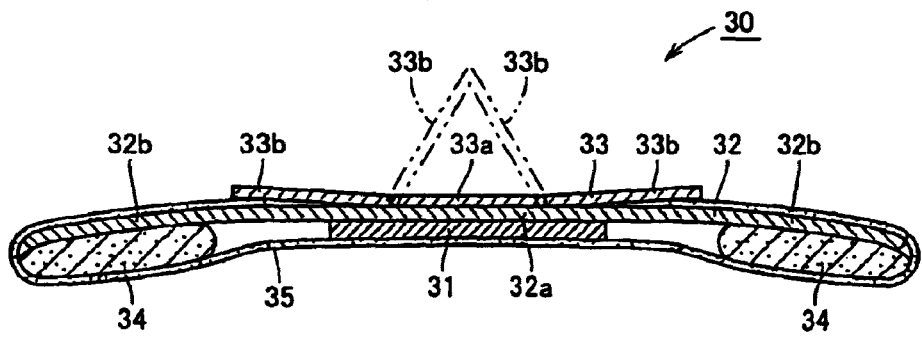
Figure 11:
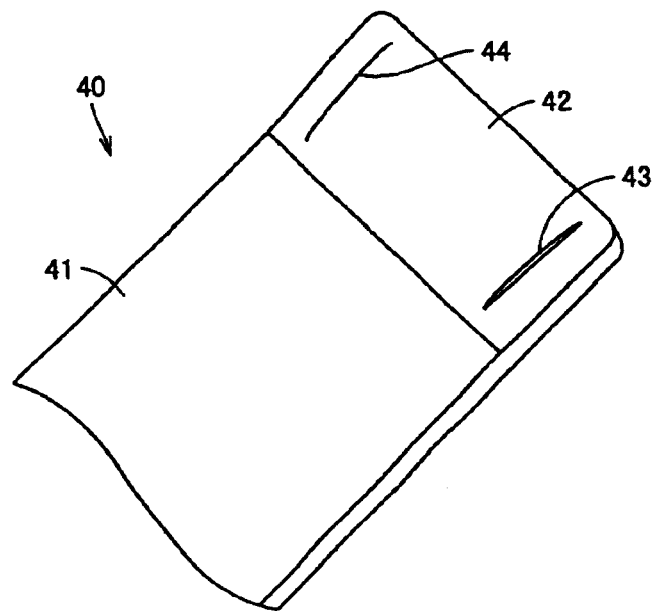
Figure 12:
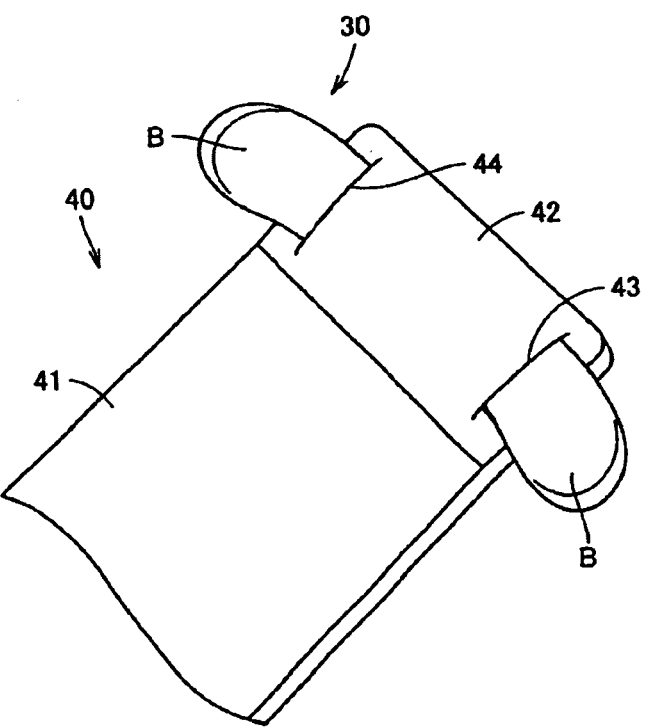
Figure 13:
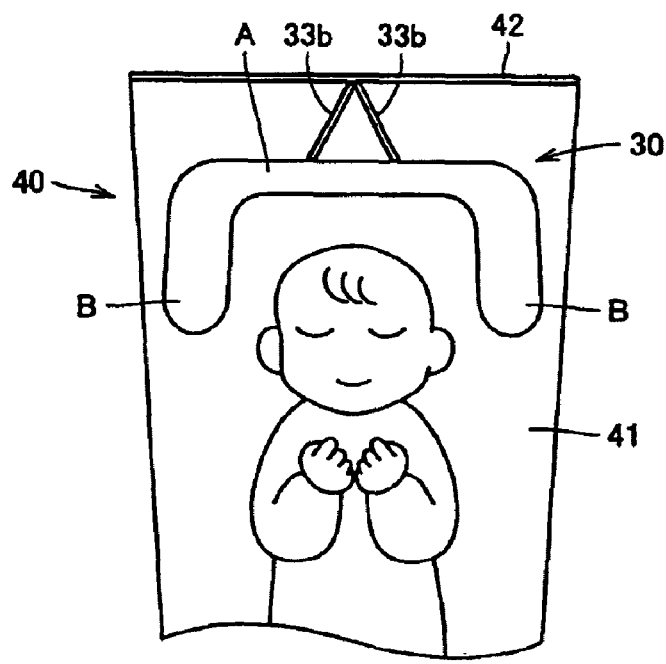
Figure 14:
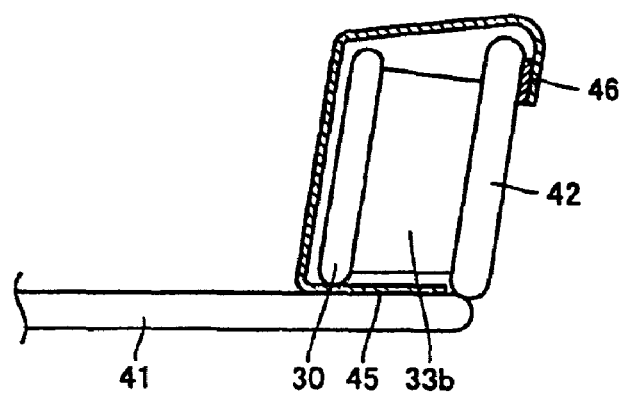

In a case of a baby who is small in size, a large gap is generated between the top wall 42 of the seat hammock 40 and the head of the baby in the bed state. When such small baby is put in the seat, as shown in FIGS. 13 and 14, the head protector 30 is detached from the seat hammock 40 and the bending parts 33b of the back face plate 33 are raised backward. Then, the head protector 30 is mounted on the front face of the top wall 42 by using a connection band 45.

One end of the connection band 45 is fixed to an upper end of the backrest wall 41 of the seat hammock and the other end thereof is wound around the head protector 30 and then connected to the back face of the top wall 42 through a surface fastener 46.

Since the bending parts 33b of the back face plate abut on the top wall 42 in a raised state, a main part of the head protector 30 is positioned apart from the top wall 42. FIGS. 13 and 14 show the seat in the bed state. As shown in the drawings, even when the baby is small, since the head protector 30 is positioned apart from the top wall 42 of the seat hammock 40, the side regions B of the head protector 30 can be positioned close to the temporal regions of the baby.

When the baby grows up in size, the bending parts 33b of the head protector 30 go along the elastic plate 32 as shown in FIG. 10 and the head protector 30 is used as shown in FIG. 12.

Although the present invention was described with reference to the drawings above, the present invention is not limited to the illustrated embodiments only. Various modifications and variations can be added in the same or an equivalent range of the present invention.

What is claimed is:

1. A head protector of a child-care instrument detachably connected to a top wall of a seat forming member having a backrest wall and a top wall flexibly connected to an upper end of the backrest wall so as to be flexibly repositionable between a first position approximately coplanar with said backrest wall and a second position extending at an angle forwardly from said upper end of said backrest wall along a top of the head of the child, comprising:
    a center region overlapping and connected to said top wall;
    an interval adjusting member for adjusting an interval between said center region and said top wall; and
    a pair of side regions extending sideward from both sides of said center region so as to be able to bend relative to said center region;
    wherein said head protector has bending elasticity so that said side region, can be bent forward from said center region and so that said side regions are elastically urged into a position coplanar with said center region.

2. The head protector of the child-care instrument according to claim 1, comprising: a center plate positioned at said center region and an elastic plate stuck on said center plate, wherein said elastic plate includes side extending parts extending from both sides of said center plate to form said pair of side regions.

3. The head protector of the child-care instrument according to claim 2, comprising a back face plate stuck on a back face of said elastic plate at said center region, wherein said back face plate includes a center fixed part fixed to maid elastic plate and a pair of bending parts flexibly connected to both side edges of said center fixed part through a hinge.

4. A child-care structure adapted to seat, support and protect a child, comprising:
    a seat adapted to have a bottom of the child supported thereon;
    a backrest adapted to have a back and a head of the child supported thereon, wherein said backrest is deflectably connected to maid Seat so as to be selectively deflectable between a first backrest position coplanar with said seat and a second backrest position extending upwardly at an inclined angle relative to said seat; and
    a head protection structure including a central portion and two side flaps extending laterally opposite one another from lateral edges of said central portion;
    wherein:
    said seat, said backrest and said head protection structure are connected to one another successively in a longitudinal direction of said child-care structure, and a transverse direction extends transversely relative to said longitudinal direction;
    said central portion of said head protection structure is deflectably connected to an upper end of said backrest opposite said seat so as to be selectively deflectable between a first protector position having said central portion extending coplanar with said backrest and a second protector position having said central portion extending upwardly at an inclined angle relative to said backrest so as to bound a top side of the head of the child;
    said central portion includes a top wall that is deflectably connected to said upper end of said backrest and a central member that overlaps, extends transversely along and is secured to said top wall;
    said head protection structure further comprises an adjustable spacer arrangement interposed and establishing an adjustable spacing distance between said central member and said top wall; and
    said two aide flaps are respectively deflectably connected to said lateral edges of said central portion being lateral edges of said central member so that said side flaps are selectively deflectable between a first flap position having said flap extending in said transverse direction laterally outwardly from said central portion and a second flap position having said flap extending at an angle relative to said central portion and in said longitudinal direction toward said seat when said central portion is in said second protector position.

5. The child-care structure according to claim 4, wherein said side flaps are connected only to said central portion of said head protection structure, and are not connected directly to said backrest, and are not adapted to be connected directly to said backrest.

6. The child-care structure according to claim 4, wherein said central portion and said side flaps extend in common transversely along said transverse direction when said flaps are in maid first flap position.

7. A child-care structure adapted to seat, support and protect a child, comprising:
    a seat adapted to have a bottom of the child supported thereon;
    a backrest adapted to have a back and a head of the child supported thereon, wherein said backrest is deflectably connected to said seat so as to be selectively deflectable between a first backrest position coplanar with said seat and a second backrest position extending upwardly at an inclined angle relative to said seat; and
    a head protection structure including a central portion and two side flaps extending laterally opposite one another from lateral edges of said central portion;
    wherein:
    said seat, said backrest and said head protection structure are connected to one another successively in a longitudinal direction of said child-care structure, and a transverse direction extends transversely relative to said longitudinal direction;
    said central portion of said head protection structure is deflectably connected to an upper end of said backrest opposite said seat so as to be selectively deflectable between a first protector position having said central portion extending coplanar with said backrest and a second protector position having said central portion extending upwardly at an inclined angle relative to said backrest so as to bound a top side of the head of the child;

said two side flaps are respectively deflectably connected to said lateral edges of said central portion so that said side flaps are selectively deflectable between a first flap position having said flaps extending in said transverse direction laterally outwardly from said central portion and a second flap position having said flags extending at an angle relative to said central portion and in said longitudinal direction toward said seat when said central portion is in said second protector position; and said central portion includes a top wall that is integrally, unitarily and flexibly joined to said upper end of said backrest whereby said central portion is deflectably connected to said backrest.

8. The child-care structure according to claim 7, wherein said seat, said backrest and said top wall are respective portions of a unitary integral resin plate, said backrest is flexibly joined to said seat along a first thinned portion of said resin plate forming a first flexible hinge, said top wall is flexibly joined to said backrest along a second thinned portion of said resin plate forming a second flexible hinge, and said first and second flexible hinges respectively extend linearly in said transverse direction.

9. The child-care structure according to claim 7, wherein said head protection structure further includes two hinges respectively deflectably connecting said side flaps to said lateral edges being lateral edges of said top wall.

10. The child-care structure according to claim 9, therein said top wall and said side flaps are respective portions of a unitary integral plate, and said hinges are flexible unitary integral joints formed by thinned portions of said plate.

11. The child-care structure according to claim 7, wherein said top wall is a flat planar wall member.

12. The child-care structure according to claim 4, wherein said central member and said side flaps are respective flexibly joined portions of a unitary integral flexible plate member.

13. The child-care structure according to claim 4, wherein said side flaps are portions of a flexible plate that extends in said transverse direction and is secured to said central member so as to flexibly deflectably connect said side flaps to said central member, and said head protection structure further includes a cloth cover that covers said central member and said flexible plate including said side flaps.

14. The child-care structure according to claim 4, wherein said central portion is deflectable about a first hinge axis relative to said backrest, said two side flaps are deflectable respectively about two second hinge axes relative to said central portion, said first hinge axis extends in said transverse direction, and said second hinge axes each extend perpendicular to said first hinge axis.

15. The head protector of the child-care instrument according to claim 1, wherein said side regions are formed of a flexural material.

16. The head protector of the child-care instrument according to claim 1, wherein said head protector integrally includes said center region and maid pair of side regions.

17. The head protector of the child-care instrument according to claim 16, wherein said head protector is formed of a flexural material.

* * * * *

UNITED STATES PATENT AND TRADEMARK OFFICE
CERTIFICATE OF CORRECTION

PATENT NO. : 6,935,685 B2
DATED : August 30, 2005
INVENTOR(S) : Kassai et al.

It is certified that error appears in the above-identified patent and that said Letters Patent is hereby corrected as shown below:

Title page,
Item [75], Inventors, after "Kassai" replace "Osaki" with -- Osaka --.

Drawings,
Replace Sheets 1-7 consisting of Figs. 1-14 with the attached sheets 1-7 consisting of Figs. 1-14.

Column 5,
Line 40, after "side" replace "region," with -- regions --.
Line 52, after "fixed to" replace "maid" with -- said --.
Line 61, after "connected to" replace "maid Seat" with -- said seat --.

Column 6,
Line 25, after "two" replace "aide" with -- said --.
Lines 29 and 31, before "extending" replace "flap" with -- flaps --.
Line 43, before "first" replace "maid" with -- said --.

Column 7,
Line 8, after "side" replace "flags" with -- flaps --.
Line 11, before "extending" replace "flags" with -- flaps --.
Line 32, after "claim 9," replace "therein" with -- wherein --.

Column 8,
Line 28, before "pair" replace "maid" with -- said --.

Signed and Sealed this

Seventh Day of February, 2006

JON W. DUDAS
*Director of the United States Patent and Trademark Office*